(12) United States Patent
Puetz et al.

(10) Patent No.: US 6,363,871 B1
(45) Date of Patent: Apr. 2, 2002

(54) QUICK CHANGE SEED BOOT

(75) Inventors: Ryan Murray Puetz; Linus Ian Yeager, both of St. Brieux (CA)

(73) Assignee: F. B. Bourgault Tillage Tools Ltd., St. Brieux (CA)

( * ) Notice: Subject to any disclaimer, the term of this patent is extended or adjusted under 35 U.S.C. 154(b) by 0 days.

(21) Appl. No.: 09/416,317

(22) Filed: Oct. 12, 1999

(30) Foreign Application Priority Data

Oct. 29, 1998 (CA) .............................................. 2252252

(51) Int. Cl.⁷ ................................................. A01C 7/00
(52) U.S. Cl. ....................................... 111/152; 111/170
(58) Field of Search ............................... 111/170, 174, 111/175, 127, 120, 123, 124, 125, 152, 149, 153, 154, 155, 156

(56) References Cited

U.S. PATENT DOCUMENTS

| | | | | |
|---|---|---|---|---|
| 2,872,248 A | * | 2/1959 | Martin | |
| 3,653,550 A | * | 4/1972 | Williams | 222/136 |
| 4,296,695 A | * | 10/1981 | Quanbeck | 111/34 |
| 4,949,656 A | * | 8/1990 | Lyle et al. | 111/174 |
| 5,067,421 A | * | 11/1991 | Andersson | 111/174 X |
| 5,357,883 A | * | 10/1994 | Depault | 111/118 |
| 5,379,706 A | * | 1/1995 | Gage et al. | 111/174 X |
| 5,392,722 A | * | 2/1995 | Snipes et al. | 111/174 |
| 5,394,945 A | * | 3/1995 | Desmarais | 111/127 X |
| 5,481,990 A | * | 1/1996 | Zacharias | 111/174 |
| 5,495,895 A | * | 3/1996 | Sakamoto | 111/170 X |
| 5,655,468 A | * | 8/1997 | Ledermann et al. | 111/174 X |
| 5,906,166 A | * | 5/1999 | Wagner | 111/170 |
| 6,178,901 B1 | * | 1/2001 | Anderson | 111/170 X |

* cited by examiner

Primary Examiner—Christopher J. Novosad (57) ABSTRACT

A unique quick change system constitutes the present invention. The invention comprises a two-piece seed boot holder and spreader for use with air seeding devices used in agriculture. The seed boot holder is adapted to bolt onto the shank of an ordinary cultivator behind a seeding opener. The spreader portion of the seed boot matingly engages the holder and is secured by an easily removable pin. Depending upon the desired spread of the seed and fertilizer and the size of the trench created by the seeding opener, various spreader attachments can be used. Thus, the invention allows the farmer to quickly change the spread of seed and/or fertilizer to match his quick change seeding opener without effort and no reconstruction.

16 Claims, 7 Drawing Sheets

QUICK CHANGE SEED BOOT

BACKGROUND OF THE INVENTION

1. Field of the Invention

This invention relates to agricultural implements and particularly to implements which are used to broadcast seed and granular fertilizers in conjunction with an air seeder.

2. Description of the Prior Art

In the realm of cultivators, generally comprising a frame and being towable behind a power source, principally a tractor, such cultivators are equipped with a plurality of downwardly depending shanks. Attached to the shanks are ground-engaging tillage tools known as sweeps and narrow openers. Such ground-engaging tillage tools wear out from time to time and the inventors of the present invention have developed a means of changing and replacing such tillage openers quickly and conveniently.

In more recent years, air seeders have been used in conjunction with cultivators. Air seeders comprise a cart with a blower, a number of conveyance ducts, and a number of hoppers. Air seeders deposit seed in the trenches made by the sweeps and narrow openers of the cultivator. The seed boot is a component of this seed delivery system which places the seed in a trench that tillage tools create. A most important aspect of air seeding is to match the seed boot with a type of opener being used. The seed boot commonly has a splitter or spreader portion at the lower end which can spread or split the incoming path of blown seed to widen the deposit. The seed boots are capable of placing seed in a very narrow ribbon or spread it in a seven inch ribbon or split the yields to several ribbons of seed behind one opener.

Heavy duty cultivators usually use splitter or spreader type seed boots because of wide shank spacing, normally 12 inches between the shanks. A splitter type seed boot however will not work in conjunction with a narrow opener, because the trench the opener creates is not wide enough and seed is blown adjacent the trench. Thus, the same size of spreader or splitter seed boot is not always appropriate for different types of lands or crops.

In the present art, it is necessary to go through a cumbersome change process when changing from field to field or crop to crop by unbolting the shanks or the seed boots from the shanks and replacing them with different seed boots or different shanks. Such procedures are lengthy and cause a great deal of down time during the very busy and short planting season in some areas. As such, there currently exists a need to be able to quickly and efficiently change the seed-spread pattern created by the seed boot for different types of tillage tools. There is also a need to have a seed boot holder or receiver of seed permanently attached to the shank and to have a spreader portion detachably coupled thereto.

SUMMARY OF INVENTION

It is an object of the present invention to provide a quick change system and apparatus for seed boot spreads for use with cultivators.

Therefore, this invention seeks to provide a quick change seed boot adapted to be attached to a shank of a cultivator and connected to an air seeder system;

said seed boot comprising an upper holder and a lower spreader attachment;

said upper holder and said lower spreader attachment being substantially hollow in their interior;

said upper holder having a lower portion adapted to matingly engage an upper portion of said lower spreader attachment;

said seed boot further comprising a fastening means;

said fastening means being adapted to detachably connect said holder to said spreader.

The quick change seed boot of the present invention is made up of two parts; the holder and an attachment. The holder is mounted onto the shank of a cultivator with the same bolts that fasten the opener or knife to the shank. An air seeder hose is pushed into a hole at the top of the holder. The lower attachment or spreader has a male upper portion which is adapted to engage into a female pocket area of the holder. The female pocket area is obviously located on the bottom of the holder. Both the holder and the attachment are hollow to allow the seed to flow therethrough.

A fastener or pin is pushed into a hole in the holder to protrude the holder on the opposite side. The fastener can be inserted from either side of the holder. The inside of the female pocket area of the holder and the outside of the male area of the spreader attachment are equipped with an elongated recess or slot. These are adapted to engage and surround the pin or fastener.

In operation, seed is pushed down the air seeder hose by forced air and delivered through the holder tunnel area into the spreader. The seed exits through the spreader or attachment and falls into the trench created by the opener or knife. The holder remains fixed to the shank permanently while the knives or sweeps and the spreader can be removed and interchanged.

BRIEF DESCRIPTION OF THE DRAWINGS

The invention is described in greater detail in conjunction with the following drawings wherein.

DETAILED DESCRIPTION OF THE PREFERRED EMBODIMENTS

Figure 1:
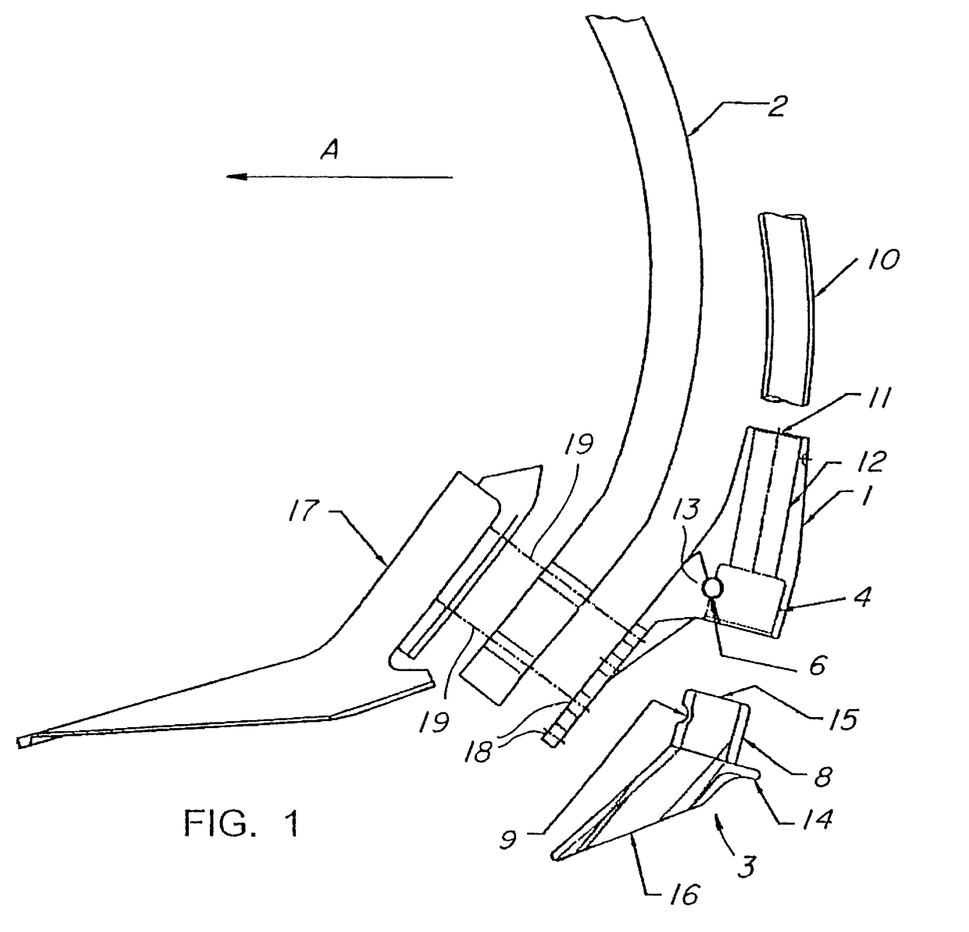
FIG. 1 is an exploded side view showing the functional parts of the bottom of a cultivator and the seed boot of the present invention.
Figure 2:
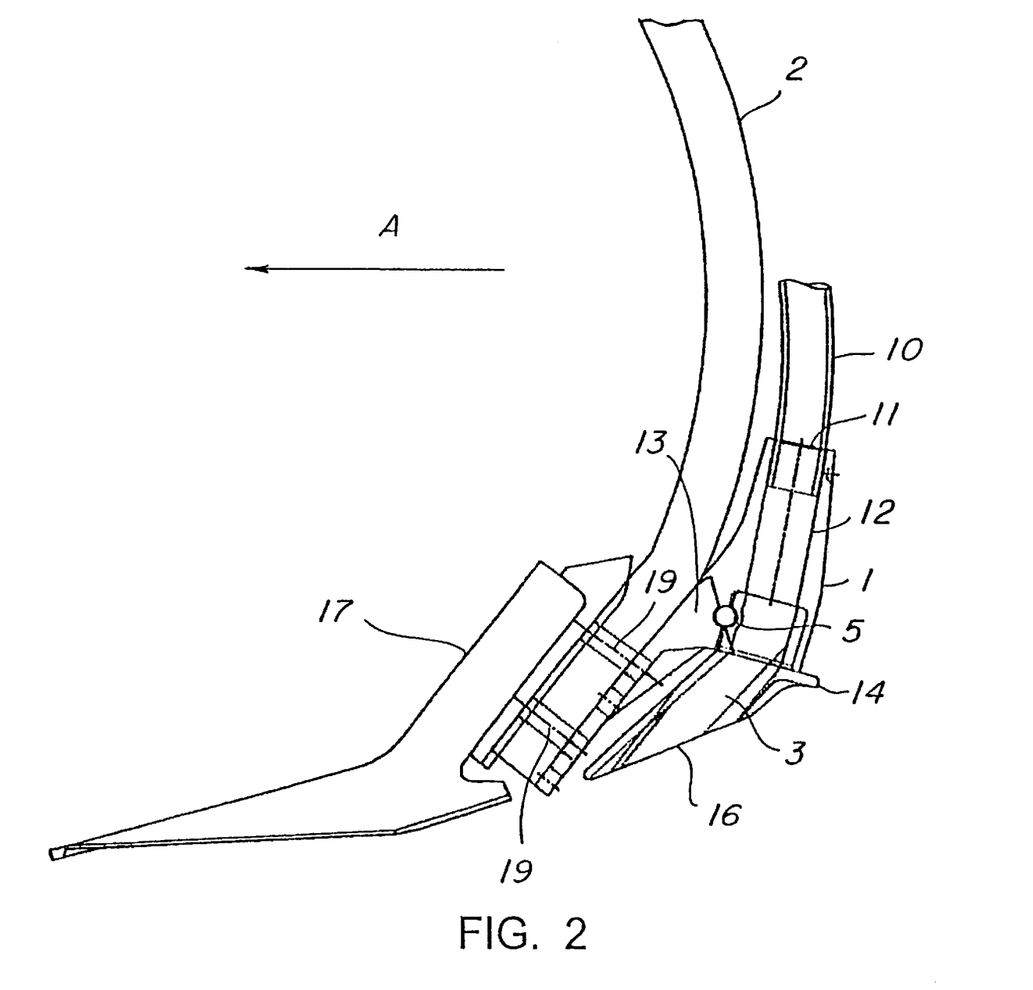
FIG. 2 is a side view of the seed boot shank and sweep firmly attached.
Figure 3:
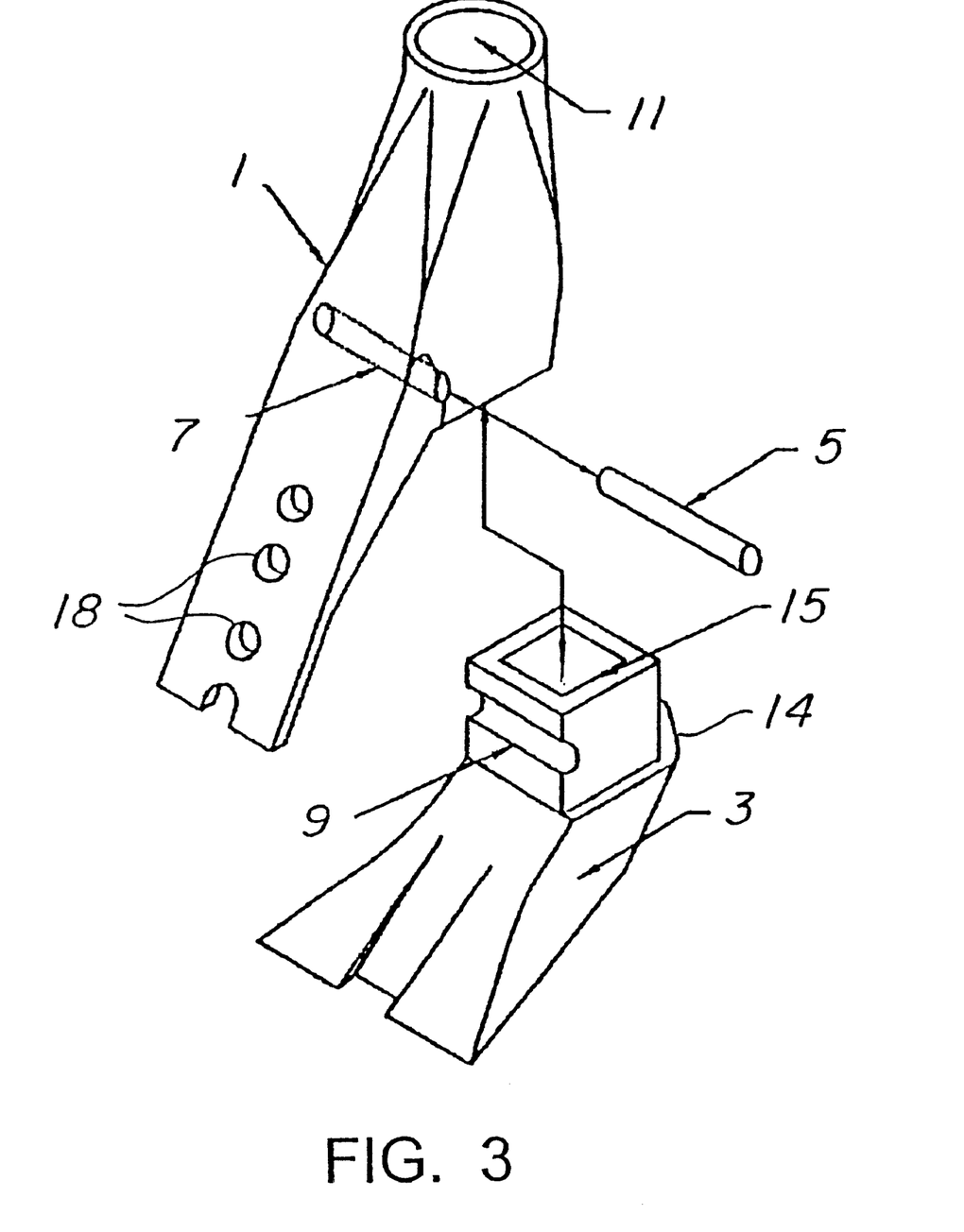
FIG. 3 is a more detailed view of the two components in perspective of the present invention.
Figure 4:
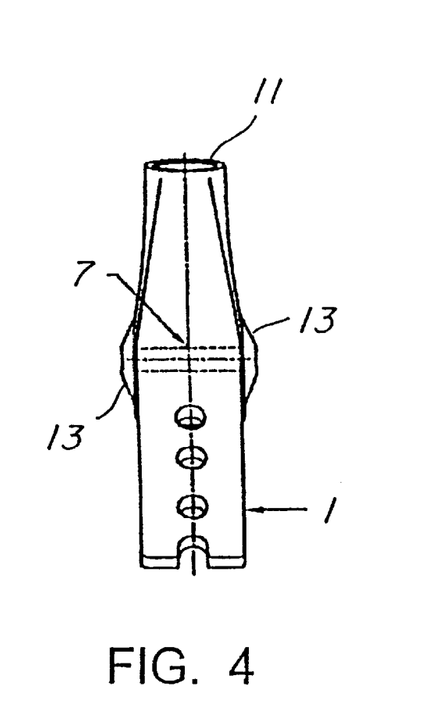
FIG. 4 is a front view of the holder portion of the present invention.
Figure 5:
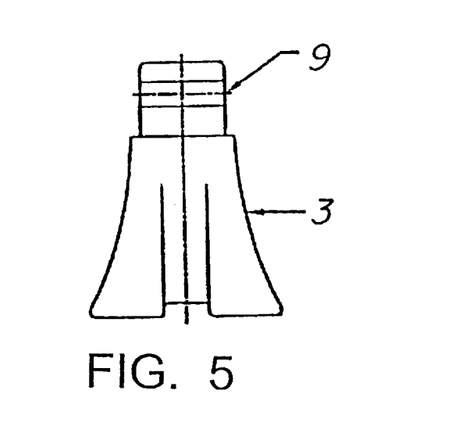
FIG. 5 is a front view of the spreader attachment portion of the presently described invention.
Figure 6A:
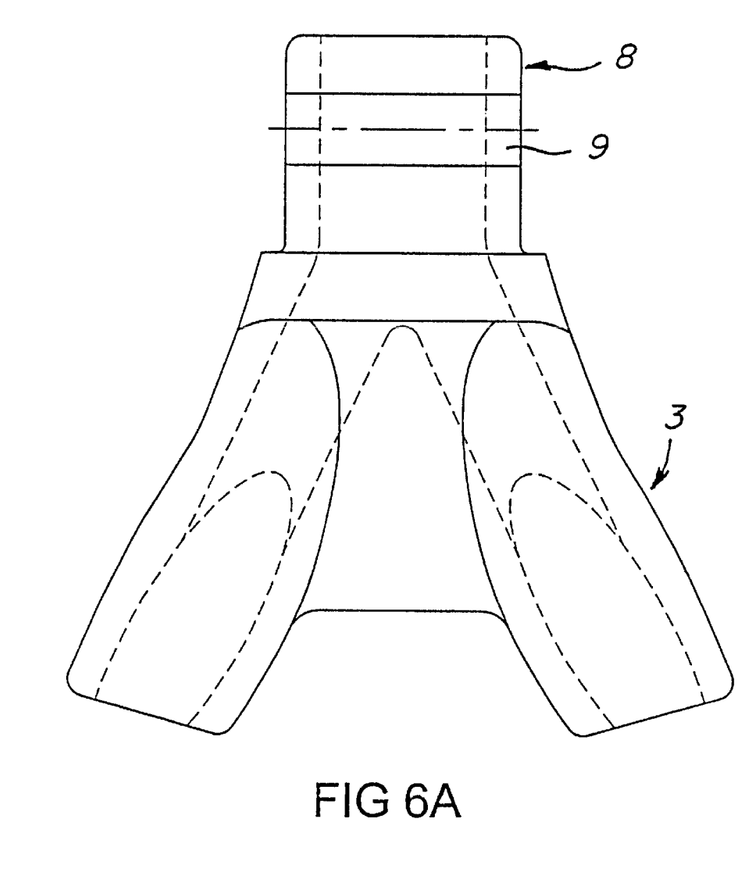
FIGS. 6a and 6b are front and side views of a splitter attachment.
Figure 6B:
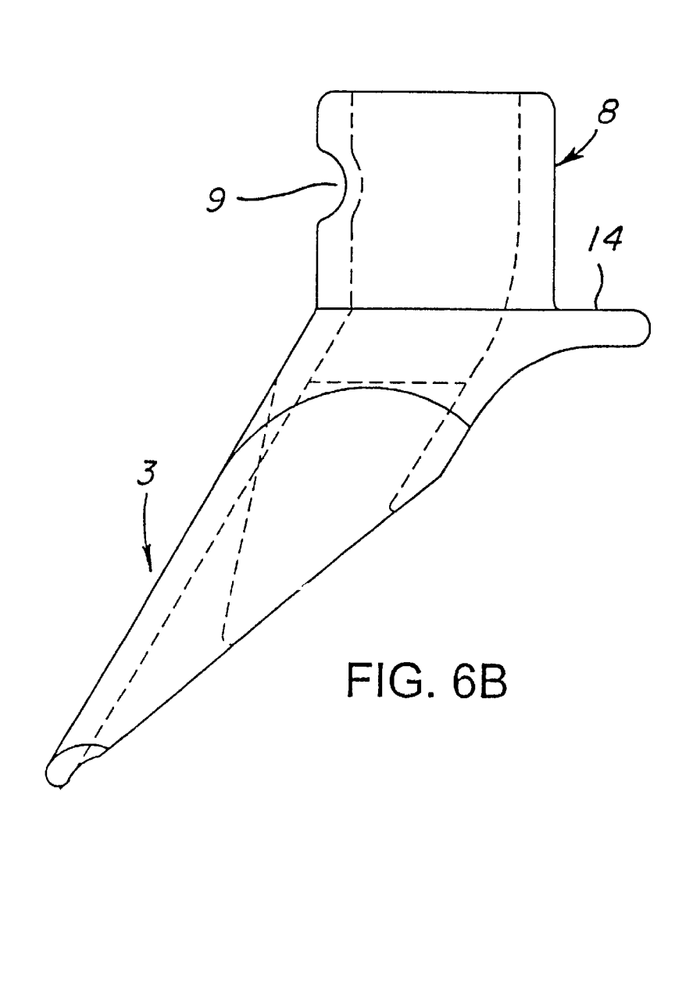
Figure 7A:
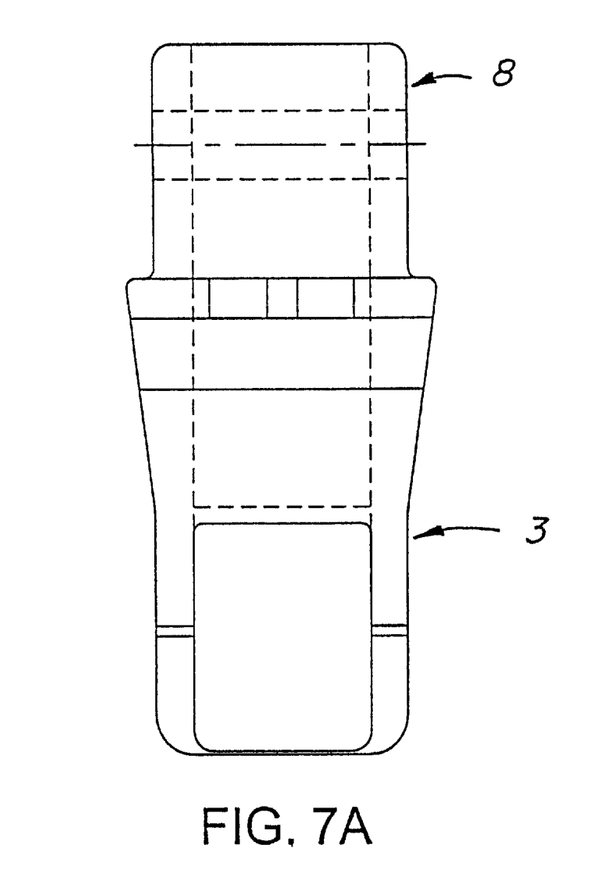
FIGS. 7a and 7b are front and side views of a straight tube attachment.
Figure 7B:
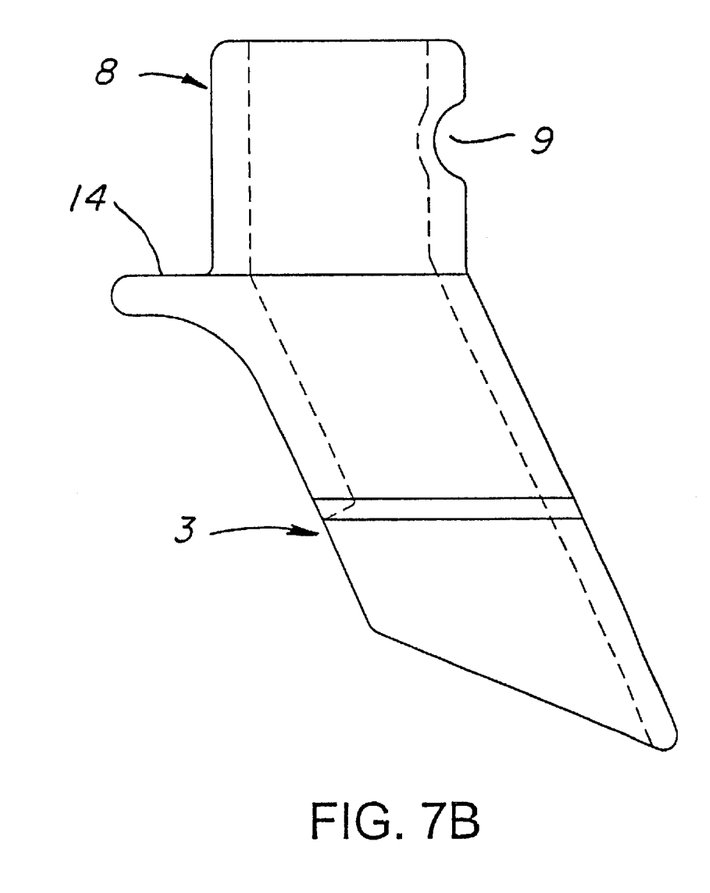
Figures 8A, 8B:
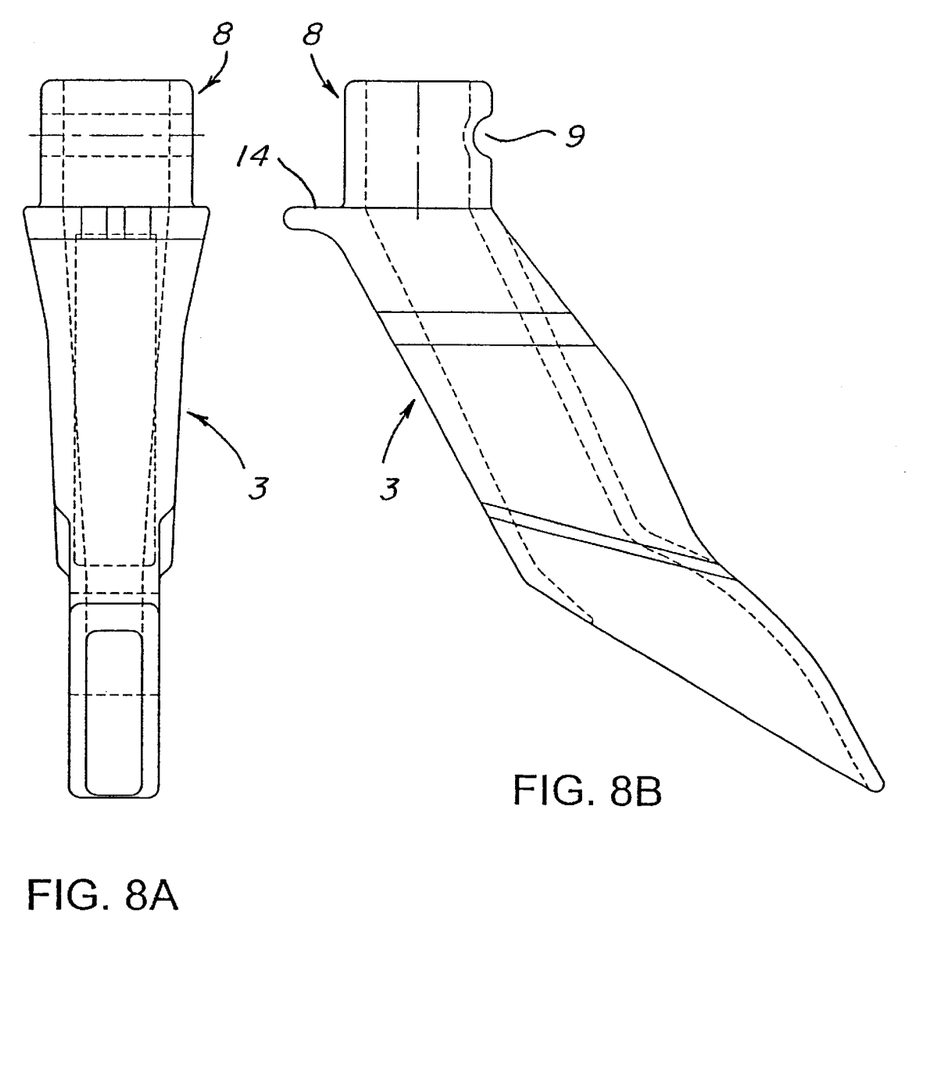
FIGS. 8a and 8b are front and side views of a narrow attachment.

In FIG. 1 there is a holder portion of the seed boot marked as (1) which is adapted to be bolted to the shank (2) of a cultivator. The shank (2) is attached to a horizontally disposed frame (not shown) which is generally supported by wheels and which is pulled forward by a power source, such as a tractor. The lower portion of the detachable changeable seed boot of the present invention bears numeral (3). The seed boot holder (1) is equipped with a lower inner cavity designated by (4) and known as the female pocket area. This is adapted to receive the male attachment area (8) of the spreader attachment (3). As shown in FIGS. 2 and 3, a pin (5) is adapted to protrude through aligned apertures (6) (FIG. 1) located on each side wall of the female pocket area (4) of the holder (1). The female pocket area (4) is also equipped with a horizontally disposed elongate semi-circular recess or slot (7) which, as shown in FIG. 3, is located on the front wall of the female pocket area. Similarly, the male attachment area (8) of spreader attachment (3) is equipped with a corresponding semi-circular recess or slot (9) located on the front wall of the male attachment area. An air seeder hose (10) which is attached to the air seeder system of hoses, ducts, manifolds, etc, is permanently placed into the opening (11) located on the upper portion (11) of the seed boot holder (1). Thus, it is directly connected to the cavity or tunnel area (12) which proceeds through the length of the seed holder. In order to protect the pin (5) from damage since it does protrude slightly through each of the apertures (6) a projection (13) is located on either side of the holder forwardly of the aperture (6). These projections appear more evidently in FIG. 4.

The spreader attachment portion (3) is also equipped with a lip (14) which protrudes rearwardly from the spreader attachment (3) slightly below the male attachment area (8). In the event that the spreader attachment (3), after removing the pin (5), will not release from the holder (1), a sharp tap on lip (14) will generally dislodge it. The spreader attachment (3) has an open top area (15) and an open spread area (16). The top and spread area are located at the top and bottom of the spreader attachment, respectively.

In operation, seed moving through the seed duct (10) enters the tunnel area (12) and then proceeds through opening (15) and out open spread area (16). A knife or sweep (17) is attached to the front portion of the shank (2) by means of bolts, shown in dotted lines as (19) in both FIGS. 1 and 2. The bolts also pass through bolt holes (18) located in the holder (1). It is to be noted that several bolt holes (18) appear in the lower portion of the holder (1) such that it may be moved upwardly or downwardly depending upon the size of the knife (17) and the spreader attachment (3).

In operation, the cultivator moves in the direction A as shown in FIGS. 1 and 2. To insert a spreader attachment (3), the male portion (8) is pressed upwardly into the female pocket area (4) of the holder (1). The pin (5) is inserted through aperture (6) and engages the sides of the recesses (7) and (9) respectively. To disengage the spreader attachment for the purposes of replacement or change, the pin (5) is removed and the male area (8) is removed from the female pocket area (4) and the repositioning procedure repeated. In the event that soil, earth or rust has collected between portions (4) and (8), a light tap externally on lip (14) is sufficient to disengage the two parts of the seed boot.

Although a pin having a spring loaded moveable detent is the preferred embodiment of the invention, it is to be understood that other fasteners such as bolts, nuts and/or screws could be used however this would detract from the convenience and the rapidity of the present invention.

We claim:

1. A quick change seed boot adapted to be attached to a shank of a cultivator and connected to a seed duct connected to an air seeder system;

said seed boot comprising an upper holder permanently attached to said seed duct and a lower spreader attachment;

said upper holder and said lower spreader attachment being hollow in their interior;

said upper holder having a lower portion adapted to matingly engage an upper portion of said lower spreader attachment;

said seed boot further comprising a detent pin;

said detent pin being adapted to detachably connect said holder to said spreader by a plurality of recesses and aligned apertures.

2. A seed boot as claimed in claim 1 wherein said lower portion of said holder includes an inner female pocket area and said upper portion of said spreader includes a male portion;

said female portion being adapted to receive said male portion in a matingly engageable manner.

3. A seed boot as claimed in claim 1 wherein said holder includes a pair of aligned apertures, one on each side of said lower portion of said holder;

said holder further including a recess on an inner wall of said lower portion; and said spreader attachment further including a recess on an outer wall of said upper portion;

said apertures and recesses being adapted in operation to receive said pin and thus fixedly connect said upper holder to said lower spreader attachment.

4. A seed boot as claimed in claim 3 wherein said recess on said inner wall of said lower portion is horizontally disposed and located on a front inner wall of said inner female pocket area; and said recess on said outer wall of said upper portion is horizontally disposed and located on a front outer wall of said male portion.

5. A seed boot as claimed in claim 3 wherein said upper holder includes a projection on each outer side wall of said holder;

said projections being adapted in operation to protect each end of said pin.

6. A seed boot as claimed in claim 1 wherein said lower spreader attachment includes an integrally formed rearwardly projecting lip which extends outwardly below said upper portion, and is adapted to assist an operator to remove said lower spreader attachment.

7. A seed boot as claimed in claim 1 wherein said upper holder includes a lower, forwardly and downwardly projecting flange;

said flange including a plurality of holes therethrough;

said holes being adapted to receive bolts and secure said upper holder to said shank of said cultivator.

8. A seed boot as claimed in claim 1 wherein said holder is adapted to engage spreader attachments having a lower discharge opening varying in dimension between ½ and 12 inches in width;

said spreader attachment being adapted to deposit seed in one or more lines depending upon said width.

9. A lower spreader attachment adapted to be used with an upper seed boot holder;

said lower spreader attachment including an upper inlet opening, a lower discharge opening, and having a substantially hollow interior;

said spreader attachment including an upper portion adapted to matingly engage a lower portion of said holder and be detachably connected therewith by a detent pin.

10. A spreader attachment as claimed in claim 9 wherein said upper portion of said spreader attachment is of slightly less dimension in cross-section than an interior of said lower portion of said holder;

said upper portion further including an elongate recess thereon;

said recess being adapted to partially accommodate said detent pin when said spreader attachment matingly engages said holder.

11. A seed boot holder adapted to be used with a lower spreader attachment; said holder including an upper inlet opening, a lower discharge opening and a substantially hollow interior;

said holder being adapted to be fixedly attached to a shank of a cultivator and connected to an air seeder system;

said holder including a lower portion adapted to matingly engage an upper portion of said spreader attachment and be detachably connected therewith by a detent pin.

12. A seed boot holder as claimed in claim 11 wherein an interior cross-section of said lower portion of said holder is of greater dimension than an outer cross-section of said upper portion of said spreader attachment;

said lower portion further including an elongate recess in an interior wall;

said recess being adapted to partially accommodate said detent pin when said spreader attachment matingly engages said holder.

13. A seed boot holder adapted to be used with a lower spreader attachment; said holder including an upper inlet opening, a lower discharge opening and a substantially hollow interior;

said holder being adapted to be fixedly attached to a shank of a cultivator and connected to an air seeder system;

said holder including a lower portion adapted to matingly engage an upper portion of said spreader attachment a and be detachably connected therewith by an attachment means;

wherein an interior cross-section of said lower portion of said holder is of greater dimension than an outer cross-section of said upper portion of said spreader attachment;

said lower portion further including an elongate recess in an interior wall;

said recess being adapted to partially accommodate said attachment means when said spreader attachment matingly engages said holder;

said seed boot holder further comprising a pair of aligned apertures in side walls of said lower portion of said holder;

said apertures being aligned with said elongate recesses when said spreader attachment matingly engages said seed boot holder;

such that said attachment means in operation fixedly connects said holder and said spreader attachment.

14. A seed boot holder as claimed in claim 13 wherein said attachment means is a pin.

15. A seed boot spreader adapted for use with a seed boot holder;

said spreader including an inlet opening and a discharge opening; and having a portion adapted to engage a portion of said holder and be detachably connected therewith by a detent pin.

16. A seed boot holder adapted to be used with a plurality of seed boot spreaders;

said holder including an inlet opening for permanent connection to an air seeder system and a discharge opening;

said holder being adapted to be fixedly attached to a shank of a cultivator;

said holder including one portion adapted to engage a portion of said spreader to be detachably connected therewith by a detent pin.

* * * * *

UNITED STATES PATENT AND TRADEMARK OFFICE
CERTIFICATE OF CORRECTION

PATENT NO. : 6,363,871 B1  Page 1 of 1
DATED : April 2, 2002
INVENTOR(S) : Ryan Murray Puetz et al.

It is certified that error appears in the above-identified patent and that said Letters Patent is hereby corrected as shown below:

<u>Title page,</u>
Item [73], Assignee, change "F.B. Bourgault" to -- F.P. Bourgault --

Signed and Sealed this

Twenty-fifth Day of June, 2002

Attest:

Attesting Officer

JAMES E. ROGAN
*Director of the United States Patent and Trademark Office*